United States Patent [19]
Aschberger

[11] 3,708,845
[45] Jan. 9, 1973

[54] FORGE ROLL FOR WELDING OF THIN-WALL TUBING

[75] Inventor: Anton A. Aschberger, Oak Lawn, Ill.

[73] Assignee: Continental Can Company, Inc., New York, N.Y.

[22] Filed: Jan. 19, 1971

[21] Appl. No.: 107,641

[52] U.S. Cl. ..................................................29/132
[51] Int. Cl. ..............................................B21b 31/08
[58] Field of Search .......29/129.5, 132, 110; 165/47, 165/86; 228/44, 17; 75/174

[56] References Cited

UNITED STATES PATENTS

| | | | |
|---|---|---|---|
| 2,964,251 | 12/1960 | Samuels et al. | 29/132 X |
| 3,188,206 | 6/1965 | Michael | 75/174 |
| 3,240,414 | 3/1966 | Cannon et al. | 29/132 X |
| 3,503,792 | 3/1970 | Baginski et al. | 75/174 X |
| 2,826,005 | 3/1958 | Wynne | 29/110 |

*Primary Examiner*—Alfred R. Guest
*Attorney*—Diller, Brown, Ramik & Holt

[57] ABSTRACT

This invention relates to a pressure roll which may be utilized either solely for the application of pressure in the formation of a forge welded seam, or may be utilized both for the application of pressure and the introduction of electrical energy in the forming of a welded seam in tubing. The roll is constructed so as to have a full flow of coolant therethrough and is of a two-piece construction including a hub and a tire. Principal features are the securement of the tire on the hub by a shrink fit and the forming of the tire of a material which is least affected by temperature changes.

2 Claims, 6 Drawing Figures

PATENTED JAN 9 1973　　　　　　　　　　3,708,845

INVENTOR
ANTON A. ASCHBERGER

By Diller, Brown, Ramik & Holt
ATTORNEYS

FORGE ROLL FOR WELDING OF THIN-WALL TUBING

This invention relates in general to new and useful improvements in the welding of seams of thin walled tubing, and more particularly to a novel forge roll for use in such welding.

BACKGROUND OF THE INVENTION

In the forming of welded seam in thin walled tubing, rolls, normally forge rolls, are utilized to apply sufficient pressure against the heated metal so as to effect the welding together of the heated metal. In some instances, the metal is heated in advance of the metal being brought between the pair of forge rolls, and in other instances, the rolls are utilized as roller electrodes and at the same time apply sufficient pressure to the metal being welded both for the purpose of assuring good contact between the lapped layers and for effecting a forge or pressure welding together of the metal, the metal not being heated to a melting temperature.

It will be readily apparent that these rolls are subjected to considerable thermal and compressive stresses. Due to these high stresses, roll life has been quite limited.

Three factors govern the stress that a roll is subject to: geometrical relationship and design of the roll, material selected for the roll, and the temperature difference between the inside of the roll and the welding material.

While some reduction in stresses can be gained by manipulation of the geometric factors, their effect is relatively small, moreover, the space available usually dictates the design.

While the surface temperature of the roll is determined by the material being welded, the temperature difference across the roll can be regulated by suitable cooling. The roll can be constructed from two or more pieces such that an adequate quantity of coolant can flow through it. By selecting a fairly high coolant temperature, the thermostress across the roll can be kept at acceptable levels.

In the past, attempts have been made to provide cooled forge rolls. However, in order to effect a proper cooling of the roll surface, it is necessary that the roll surface be formed as a separate component. In the past, when this has been done, there have been repeated failures both in the form of stressing and cracking of the roll element or rim, and leakage between the rim and the hub on which it is mounted.

SUMMARY OF THE INVENTION

In accordance with this invention, the roll includes a hub which has a tire shrunk thereon. The shrinking of the tire over the hub has the effect of prestressing the tire in tension. This prestressing reduces the amount of stress variation for each roll cycle and therefore, increases roll fatigue life.

Another advantage of forming the rims separate from the hub is that the hub may be machined to define an annular cooling passage whereby a maximum amount of coolant is brought into surface contact with the tire at all times, thereby providing for any desired temperature differential between the outer and inner surfaces of the tire.

A further feature of the invention is the selection of materials for the formation of the tire which have adequate strength and which are least effected by temperature differentials. It has been found that the refractory metals and their alloys have exceptionally high temperature strength. Refractory metals such as Tantalum and Columbium are particularly desirable.

With the above and other objects in view that will hereinafter appear, the nature of the invention will be more clearly understood by reference to the following detailed description, the appended claims and the several views illustrated in the accompanying drawings:

Figure 1:
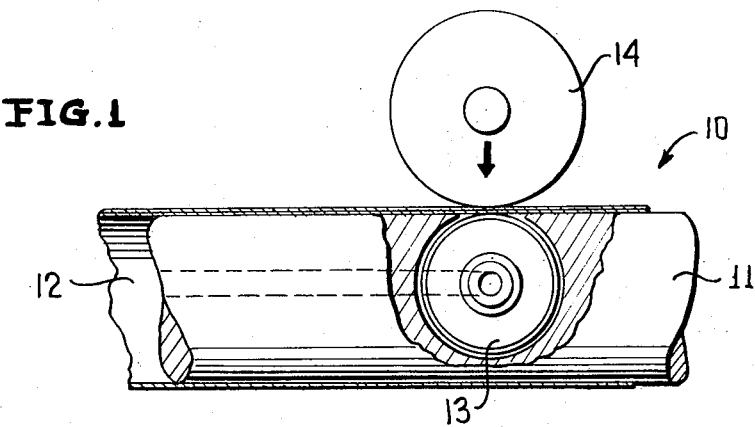
FIG. 1 is a schematic view showing typical roll installations in the formation of welded seams in thin-wall tubing.

Referring now to the drawings in detail, it will be seen that there is illustrated a typical welding installation which is generally identified by the numeral 10. The welding installation includes a horn 11 over which the shaped tubing 12 is moved. The horn 11 is provided with an internal roll 13 which has associated therewith an external roll 14. The rolls 13 and 14 are only schematically shown as are the other details of the welding installation 10, and the external roll 14 is mounted so that a pressure is applied therewith against the lapped portions of the tubing 12 passing between the rolls 13 and 14.

It is to be understood that the rolls 13 and 14, in certain welding installations, will be merely forge rolls with the metal being heated in advance of the rolls 13 and 14 electrically by resistance or induction heating. On the other hand, the rolls 13 and 14 may function as roller electrodes for the purpose of introducing sufficient current into the lapped portions of the tubing 12 to effect the heating thereof to a temperature short of melting and wherein the rolls 13 and 14 will have the added function of forging together the heated metal.

It is to be understood that the pressure applied by the roll 14 will vary depending upon the type of welding. It is also to be understood that in some instances, the double thickness of the metal of the tubing 12 will be reduced to substantially a single thickness whereas in other types of welding, particularly that where the rolls function as electrodes, there will be only minor reduction in thickness of the metal at the lap.

This disclosure is restricted to the details of the roll 13 which is mounted internally of the horn 11 and, of necessity, is of a reduced diameter in that the diameter of the horn 11 is restricted by the diameter of the tubing 12 being welded. However, the constructional details and properties of the roll 13 may equally as well be applied to the roll 14.

It is also to be understood that when the roll 13 is utilized as a roller electrode, a suitable electrical joint must be provided between the roll 13 and a lead. However, inasmuch as this is not part of the present invention, no attempt has been made to illustrate the electrical connection to the roll 13.

In accordance with this invention, the roll 13 is of a two-piece construction and includes a hub, which is generally identified by the numeral 15, and a tire or rim, which is generally identified by the numeral 16.

The hub 15 includes a main hub portion 17 having a pair of spindle portions 18,20 projecting from opposite sides thereof. The spindle portions 18 and 20 are utilized in the mounting of the hub 15 for rotation about a predetermined axis. The bearings which are utilized to mount the hub 15 within the horn 11 are not shown in that they of themselves do not form a part of this invention. The hub body 17 is formed with a cylindrical outer surface 21 which is specifically dimensioned for receiving the tire rim 16. The surface 21 is interrupted by an annular coolant passage 22 which is of a cross section sufficient to provide for the necessary transfer of heat from the tire 16. The spindle portions 18 and 20 are provided with axial passages 23, 24, respectively, with the passage 23 being connected to the annular passage 22 by a radial passage 25 and a radial passage 26 connecting the passage 24 to the annular passage 22.

In the illustrated form of the hub 15, the radial passages 25 and 26 are diametrically remote. However, it is to be understood that the radial passages 25 and 26 will be connected to the annular passage 22 at points wherein a maximum coolant effect may be obtained. It is to be understood that one of the axial passages 23,24 will be an inlet passage and the other will be a discharge passage. Thus, there will be constant circulation of a coolant through the annular passage 22 so as to internally cool the tire or rim 16.

The tire 16 is provided with an internal surface 27 which is also cylindrical and which is of a smaller diameter than the diameter of the cylindrical surface 21 of the hub 15. The tire 16 is also provided with an external surface 28 which is rounded in cross section to conform with the contour of the tubing being welded.

Figure 2:
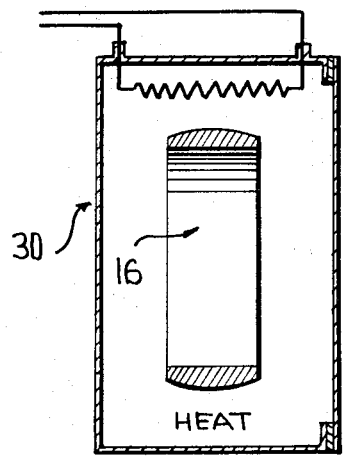
FIG. 2 is a schematic view showing the general configuration of the tire in section and the heating thereof.
Figure 3:
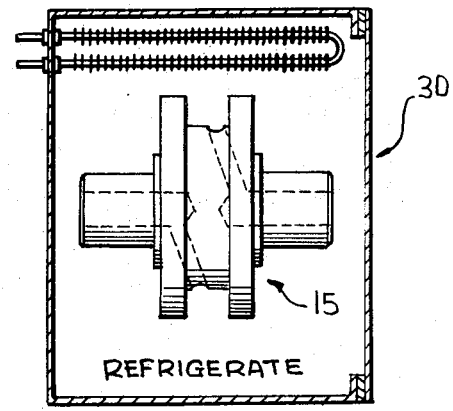
FIG. 3 is a schematic view showing generally the configuration of the hub and the cooling thereof prior to assembly.
Figure 4:
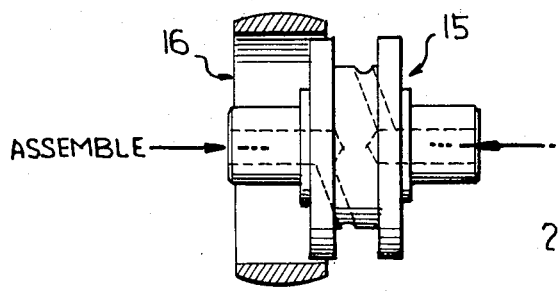
FIG. 4 is a schematic view showing the hub and tire being loosely assembled.
Figure 5:
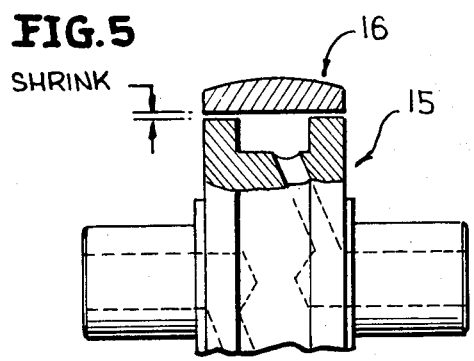
FIG. 5 is another schematic view showing the assembled hub and tire prior to the return of the temperatures thereof to normalcy.
Figure 6:
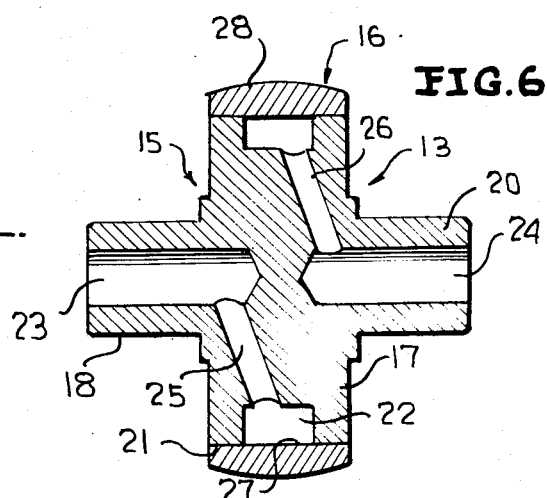
FIG. 6 is a sectional view taken through the roll formed in accordance with this invention.

As is set forth above, it has been found that the best results can be obtained by shrink fitting the tire 16 on the hub 15. Accordingly, as is schematically illustrated in FIGS. 2 and 3, prior to assembly, the tire 16 is suitably heated within a heater 30 while the hub 15 is suitably cooled within a cooling chamber 31. It has been found that in a typical installation the tire 16 will be heated to a temperature on the order of 500°–550° F. while the hub 15 will be cooled to a temperature on the order of 0° to −20° F.

When the cylindrical surfaces 21 and 27 are properly dimensioned, as the tire 16 is heated and the hub 15 cooled to the temperature ranges indicated, they may be readily assembled although in certain instances slight pressure may be required in the assembly of the tire and hub.

After the tire has been positioned in telescoped relation with respect to the hub 15, the two components are permitted to return to normal temperature with the result that the tire 16 will shrink and the hub 15 will expand and a tight fit between the tire and the hub will be assured.

It will be readily apparent that the tire 16 will be internally prestressed tensilely. This prestressing in tension reduces the amount of stress variation for each roll cycle and therefore increases roll fatigue life.

It is to be understood that roll fatigue life under the imposed stresses is largely a factor of the metallurgical properties of the material selected. It can be shown that the thermal stress arising in a heated cylinder varies linearly with three material properties: modulus of elasticity, coefficient of thermal expansion, and Poisson's ratio.

The stress may be expressed as $S_T = f\,(E\alpha/1-\mu)$. Therefore, it is most desirable to keep the product $(E\alpha/1-blz)$ as small as possible.

In the past, rolls of the type to which this invention relates have been formed of 2 percent berylium copper which has a value of about 260 lb./in.$^2$ per °F. Haynes Stellite 6B has also been used in the past and has a value of about 330.

Refractory metals and their alloys have exceptionally high temperature strength. The refractory metals and their alloys exhibit a much smaller number for the product $(E\alpha/1-\mu)$. Tantalum has, for example, a value of only 150 and Columbium has a value of about 78. Thus, comparing the stress in a Columbium roll with the stress in a 2 percent berylium copper roll, it will be seen that the stress is less than one-third, all other parameters remaining the same.

Although the refractory metals are preferred, it is feasible to form the tires of other high strength materials. For example, successful rolls have been formed with the tire fabricated from bearing steel 52100 and from the Haynes Stellite 6B.

It has been found that 2 percent berylium copper functions satisfactory for the formation of the hub. This metal has proven to be receptive to tires formed of various materials.

It is also pointed out here that tests have proven that the shrink fitting of the tire to the hub is successful where press fitting like components will fail. In testing the roll, by mistake, one roll was machined to press fitting dimensions and the tire was press fitted to the hub. This roll soon failed.

Although a preferred roll configuration has been specifically illustrated and described herein, it is to be understood that the invention is not restricted to the specific roll configuration and the roll configuration may be varied without departing from the spirit and scope of the invention, as defined by the appended claims.

I claim:

1. A roll assembly, said roll assembly being of the type specifically constructed for pressure engagement with metal at a high temperature to effect welding of the metal and comprising a hub having oppositely directed spindles, said hub having a peripheral surface for receiving a tire; an annular coolant passage in said peripheral surface, inlet and outlet passages in said spindles, and radial passages connecting said inlet and outlet passages to said annular coolant passage for the circulation of coolant therethrough; and a separate tire on said hub in sealing contact with said hub on axially opposite sides of said annular coolant passage with said tire forming an outer wall of said annular coolant passage, said tire being tensilely prestressed through a shrink fit on said hub, whereby the amount of stress variation in said tire for each roll cycle is held to a minimum.

2. The roll of claim 1 wherein said tire is formed of a refractory metal of the class including Tantalum and Columbium.

* * * * *